United States Patent Office 2,970,474
Patented Feb. 7, 1961

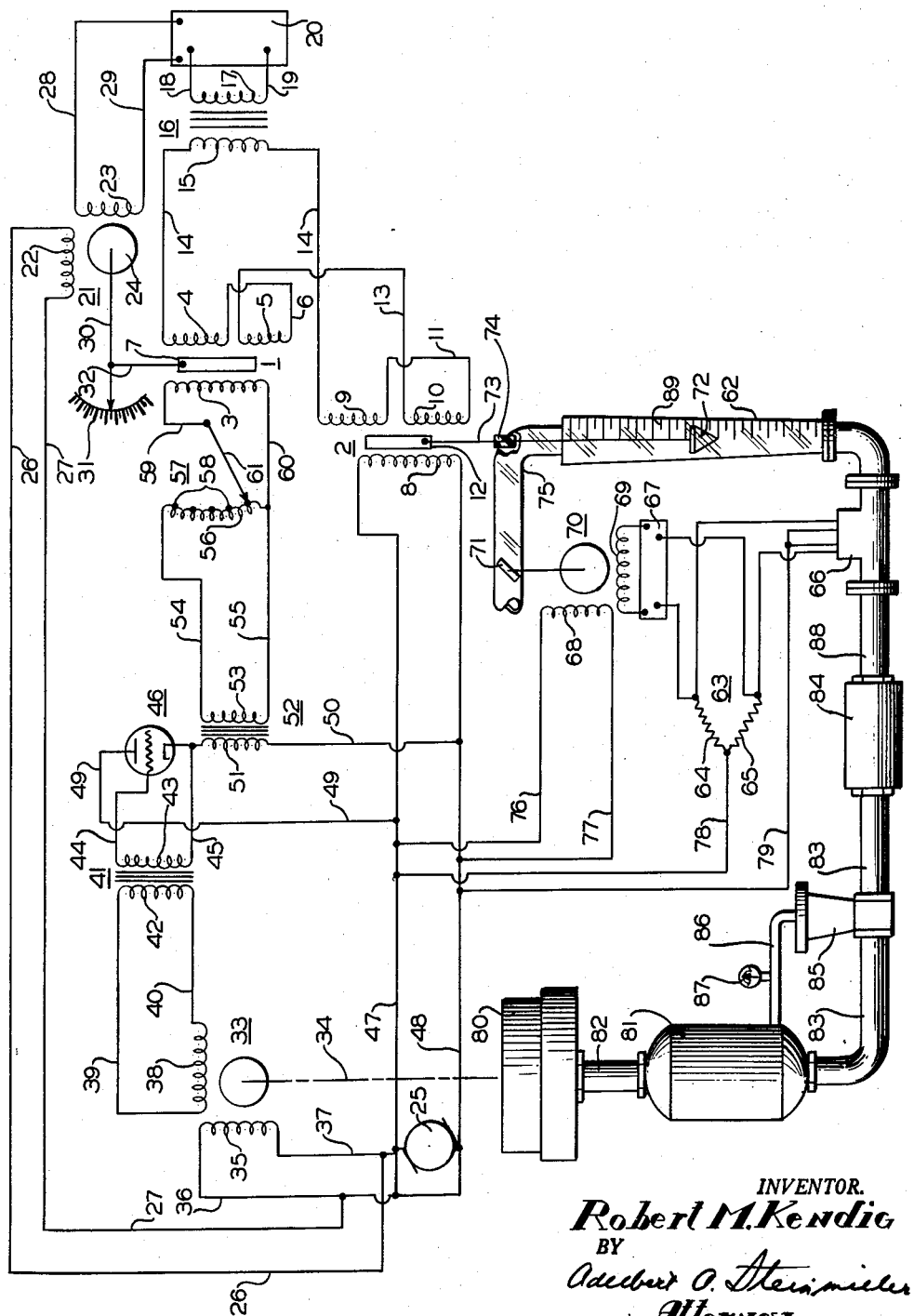

1

2,970,474
COMPRESSOR EFFICIENCY DETERMINING APPARATUS

Robert M. Kendig, Trafford, Pa., assignor to Westinghouse Air Brake Company, Wilmerding, Pa., a corporation of Pennsylvania Filed Aug. 29, 1957, Ser. No. 681,090

2 Claims. (Cl. 73—112)

This invention relates to compressor test apparatus and more particularly to an air compressor test apparatus in which compensation for temperature and pressure changes of a gas being compressed is automatically indicated simultaneously with an automatic conversion of said compensated indications cooperatively with other factors such as compressor speed and displacement to provide an automatic continuous actual indication of the volumetric efficiency of said compressor.

A common method for determining the volumetric efficiency of an air compressor is to operate the compressor against a first volume charged with air at a given pressure and then manually controlling the flow of air under pressure from said first volume to atmosphere or a second volume while noting various factors such as rate of flow, number of compressor revolutions, pressure changes, temperature changes, etc. as indicated by different gauges and meters. The volumetric efficiency of the compressor is then calculated by first compensating for the temperature and pressure changes in both the first and second volumes to provide an actual compressor discharge volume indication corrected to the temperature and pressure at the inlet to the compressor, said indication hereinafter referred to as the compensated rate of flow. The compensated rate of flow indication is divided by the product of the actual number of compressor revolutions multiplied by the displacement of the compressor per revolution expressed in cubic feet to arrive at a quotient figure indicating the percentage of volumetric efficiency of the compressor. In making the above-described test, the human element of timing, of control of the given pressure volume, of recording and compensating temperature and pressure changes in the two mentioned volumes, and of counting the compressor revolutions during the test, results at best in an approximation of the volumetric efficiency rating of the compressor and not an actual rating as desired.

According to the present invention, there is provided in association with a compressor test apparatus and a temperature compensated flow meter of the type disclosed in a copending application Serial No. 660,588, assigned to the assignee of this invention, an automatic volumetric efficiency indicating apparatus operative on a null balance principle of two linear variable differential transformers having their respective secondary windings serially connected. The primary of the first of said linear variable differential transformers is supplied from the secondary of a calibrated auto-transformer with an alternating current voltage proportioned to the speed of the compressor multiplied by a voltage factor indicating the volumetric displacement of the compressor in cubic feet per revolution. The primary of the second of said linear variable differential transformers is supplied with an alternating current voltage of the same cycle and phase and similar magnitude as that supplied to the primary of the previously described first variable differential transformer. The secondaries of the two differential transformers are so interconnected in series with the primary of a load

2 transformer such that when the output voltage and current of the secondaries are equal and opposite in magnitude, direction and phase, no current will flow in the primary of said load transformer. Any difference between the output of the first differential transformer as may be caused by fluctuations in compressor speed or displacement, and the output of the second differential transformer as may be caused by fluctuations in the measure of air flow such as indicated by the temperature compensating flow meter, causes a current to flow in the mentioned load transformer which is amplified and fed to the control winding of a two-phase servomotor which in turn operates to restore the balance between the output of the secondaries of the two differential transformers and simultaneously actuate a pen which indicates the actual volumetric efficiency.

It is therefore the primary object of the invention to provide apparatus for obtaining an automatic continuous indication of the actual volumetric efficiency of an air or gas compressor.

It is also an object of the invention to provide apparatus for obtaining a continuous indication of the volumetric efficiency of an air compressor with automatic continuous compensation for temperature changes, pressure changes, and human error in timing and speed calculations.

Still another object of the invention is to provide apparatus for effecting electrically an automatic calculation of the volumetric efficiency of a compressor for compressing non-combustible gases, said apparatus having automatic temperature compensation and electronic timing and speed indication.

Other objects and advantages of the invention will become apparent from the following detailed description of the invention taken in connection with the accompanying single drawing which is a diagrammatic view partly in section and partly in outline of an air compressor volumetric efficiency indicating apparatus embodying the present invention.

Description

In the drawing, the compressor efficiency determining apparatus comprising the invention is illustratively shown in connection with an air compressor apparatus and a flow meter with temperature compensating means. The efficiency determining apparatus comprises in part, two linear variable differential transformers, hereinafter referred to as differential transformer 1 and differential transformer 2. Although a complete understanding of the theory and operation of a linear variable differential transformer is not essential to the understanding of the operation of the present invention, a brief explanation such as follows will be of assistance in understanding the principles of operation of the invention as a whole. Briefly, a linear variable differential transformer is an electro-mechanical transducer which produces an electrical output proportional to the displacement of a separate movable core. In principle, the relative position between a core and a single coil can be measured in terms of self-inductance of the said coil. Utilizing several coils with a proper arrangement, it is possible to utilize the motion of a core to cause variations in mutual inductance between these coils wherein movement of the core produces a change in mutual inductance that is linear with displacement, the principle behind the linear variable differential transformer. This differential transformer includes three separate coaxial windings equally spaced along an insulating cylindrical form with a center hole parallel to the axis of the form. A movable rod-shaped magnetic core is positioned in the center hole to provide a preferred path for magnetic flux between the three windings. With a center winding or primary winding energized from a source of alternating current voltage, a voltage is produced in the two secondary or outer windings of a magnitude dependent on the position of the movable core relative to the center and two outer windings. The secondary windings are connected in series opposition such that when the core is in the exact center along the axis of the center hole, a position referred to hereinafter as the "null" position, the voltage induced in each secondary winding is equal in magnitude but opposite in phase. When the core is moved along the axis of the center hole away from the null position, the voltage induced in the winding toward which the core is moved increases, while the voltage induced in the opposite winding decreases. Utilizing proper design, the voltage variation is linear and proportioned to extent of movement of the core out of the null position. Movement of the core in the opposite direction through the null position yields a voltage characteristic similar to that mentioned previously, but with the phase of the voltage shifted 180°. A continuous plot of voltage output versus the core position is a straight line passing through a no-voltage position at the null position and shifting the phase 180°. It can thus be seen from the above that the differential transformer is essentially a self-contained device for producing an electrical output, remote from the source of power, which may be controlled in both magnitude and phase by moving a core to adjust the flux distribution within the transformer.

As previously mentioned, the present invention utilizes two differential transformers 1 and 2 with the secondary windings of each transformer connected in series opposition. The primary windings of each differential transformer 1 and 2 are energized with alternating current voltage of the same phase; thus, the total current flow induced in the secondary windings is of a magnitude in proportion to the relative displacements of each of the movable cores and with a current phase corresponding to the direction of displacement of one core relative to the other.

As shown in the drawing, the differential transformer 1 comprises a primary winding 3, secondary windings 4 and 5 connected by a wire 6, and a movable core 7. The differential transformer 2 comprises a primary winding 8, secondary windings 9 and 10 connected by a wire 11, and a movable core 12. The secondary windings 4 and 5 are connected in series opposition to the secondary windings 9 and 10 by wires 13 and 14. Serially interposed in wire 14 is the primary winding 15 of a load transformer 16, the secondary winding 17 of which is connected by wires 18 and 19 to a servo-amplifier 20.

Associated with the two differential transformers is a two-phase induction motor hereinafter referred to as servomotor 21 comprising two similar stator windings and rotor winding shown on the drawing as windings 22 and 23 and rotor 24 respectively. The winding 22 is supplied with a uniform alternating current from an alternating current generator 25 by way of wires 26 and 27. The winding 23 is supplied with alternating current from the servo-amplifier 20 via wires 28 and 29 when the combined secondaries of the two differential transformers are not balanced. Although a thorough understanding of the theory and operation of the servomotor 21 is not necessary to the understanding of the present invention, a brief explanation such as follows is of assistance. Briefly, the circuitry is arranged such that under a normal operating condition only the winding 22 is energized, however, the flux produced thereby is alternating, therefore no rotation of rotor 24 results. If a voltage is induced in the winding 23 by the servo-amplifier 20, a like flux is produced in the rotor 24 to cooperate with the flux produced by winding 22 to cause a degree of rotation of the rotor 24 proportionate to the degree of voltage in winding 23 and in a direction determined by the phase of the voltage in winding 23. With the rotor in the normal or neutral position, an indicator arm 30 indicates on precalibrated dial 31 the efficiency at the operating conditions existing at that time. After once being set as will be explained hereinafter, the indicator arm 30 will adjust to automatically indicate the volumetric efficiency of the compressor on the dial 31 under most operating conditions and without involving calculations or compilations as explained hereinafter.

Attached to the indicator arm 30 by a rod 32 is the core 7 of the differential transformer 1.

Associated with the differential transformer 1 is an alternating current tachometer generator 33 operatively connected to the crankshaft of the compressor 80 being tested by connecting means (not shown) indicated on the drawing as broken line 34. The tachometer generator 33 is excited by an exciter winding 35 connected to an alternating current generator 25 by wires 36 and 37. The output of the tachometer generator 33 is induced in winding 38 and is of a magnitude proportionate to the speed of the compressor and is of the same phase and frequency as the exciting voltage on winding 35. The output voltage of the tachometer generator 33 is supplied via wires 39 and 40 to a transformer 41 having a primary winding 42 and a secondary winding 43. The output of transformer 41 is supplied via wires 44 and 45 to an amplifier tube 46 connected as a cathode-follower amplifier, a common form of an inverse feedback amplifier, the plate circuit being shown as connected to the alternating current generator 25 at the alternating current supply lines 47 and 48 via wires 49 and 50 respectively.

Serially connected in the output wire 50 of the cathode follower amplifier is the primary winding 51 of a transformer 52 having a secondary winding 53 which in turn is connected by wires 54 and 55 to the winding 56 of a calibrated auto-transformer 57.

The use of the transformers 41 and 52 along with the cathode follower amplifier stage provides circuitry such that the load on the tachometer generator 33 is maintained constant, and sufficient output voltage is maintained to operably supply the auto-transformer 57.

The winding 56 of the auto-transformer 57 is supplied with a plurality of taps 58, each of which is calibrated to supply a certain voltage indicative of a conversion factor corresponding to the displacement of the compressor per revolution at different speeds. Thus it can be seen that the output of the auto-transformer 57 is proportional to the speed of the compressor multiplied by the conversion factor on the tap 58 indicating the volumetric displacement of the compressor in cubic feet per revolution. The output voltage of the auto-transformer 57 is supplied by wires 59 and 60 and selector arm 61 to the primary winding 3 of the differential transformer 1.

Associated with the differential transformer 2 and controlling movement of the core 12 thereof is a temperature compensated gas flow meter 62 similar to that shown and described in copending application Serial No. 660,588, filed May 21, 1957, entitled "Temperature Compensated Gas Flow Meter" and assigned to the assignee of the present invention. A complete description and a thorough understanding of the temperature compensated flow meter may be obtained from study of the mentioned copending application, however, a brief description is provided herein.

The temperature compensated flow meter comprises a flow meter 62, and a Wheatstone bridge arrangement 63 having four resistance branches. In two of the Wheatstone bridge branches 64 and 65, the resistance value is varied responsively to atmospheric temperature and pressure respectively, and in the other two branches (not shown) located within a flanged pipe fitting 66 of the compressor discharge conduit system, the resistance values are varied responsively to flow meter inlet temperature and pressure respectively. An unbalance of the resistance values of the branches of the Wheatstone bridge caused by changing resistance value of one branch thereof due to pressure or temperature changes is effective to establish a potential resulting in current flow in the Wheatstone bridge 63 to energize winding 69 of servomotor 70 to cause operation thereof in a manner similar to that described in connection with the servomotor 21, to operate a servo-amplifier 67. The servomotor 70 operates a discharge valve 71 to control the rate of air discharge from the flow meter 62 such that regulation of the flow meter temperature and pressure valves is effected to cause rebalance of the bridge. In that the indications of the flow meter indicator float 72 are correct only when the bridge 63 is balanced, a direct rate of flow reading as indicated by the indicator float 72 may be taken with air temperature variations automatically compensated for as long as the Wheatstone bridge 63 is balanced. The movable core 12 of the differential transformer 2 is connected by a rod 73 through a friction-free air-tight bushing 74 in the flow meter discharge conduit 75, to the indicator float 72 such that any movement of the indicator float 72 causes a corresponding movement of the core 12.

The winding 68 of the servomotor 70 is energized by the alternating current generator 25 via wires 47, 76, and 48, 77 respectively.

The Wheatstone bridge 63 is energized by the alternating current generator 25 via wires 47, 78 and 48, 79 respectively.

The compressor apparatus comprises an air compressor 80 for supplying air under pressure to a measured volume such as a reservoir 81 by way of a pipe 82. A pipe 83 establishes communication between reservoir 81 and a dampening reservoir 84. The pressure of air in the reservoir 81 and pipe 83 is controlled by a manually adjusted regulating valve 85 in the pipe 83. The regulating valve 85 is of the spring-biased diaphragm type in which a diaphragm (not shown) is positioned by the air pressure in the reservoir 81 via a tube 86 to regulate the opening and closing of an orifice (not shown) in the pipe 83. As the air pressure in the reservoir 81 increases, the air pressure in the tube 86 acts on the diaphragm (not shown) within the regulating valve 85 to increase the opening of the orifice (not shown) in pipe 83 and thereby decreases the air pressure in the reservoir 81. Conversely, as the air pressure in the reservoir 81 decreases, the air pressure in the tube 86 decreases such that a spring (not shown) is permitted to bias the diaphragm (not shown) to a position to decrease the opening of the orifice (not shown) in the pipe 83 and thereby effect an increase in the air pressure in the reservoir 81. Thus, it can be seen that once the biasing pressure of the spring (not shown) has been adjusted manually to any desired pressure, the pressure regulating valve 85 maintains a uniform air pressure in the reservoir 81. A pressure gauge 87 is connected to the tube 86 between the reservoir 81 and the regulating valve 85 to indicate air pressure in reservoir 81. A pipe 88 establishes communication between the dampening reservoir 84 and the flanged pipe fitting 66 which houses two branches (not shown) of the Wheatstone bridge 63.

Operation

In operation, the air compressor 80 supplies air under pressure to the reservoir 81 via pipe 82. As previously explained, a manually adjustable pressure regulating valve 85 maintains a uniform air pressure in the reservoir 81, such pressure indicated on the pressure gauge 87 being preselected to a pressure uniform to the desired head against which the compressor is to be tested. It should be noted that to initially set the apparatus to read the efficiency, the regulating valve 85 is completely closed such that the efficiency rating as indicated on the dial 31 is noted as the zero efficiency rating. Further calibration of the dial 31 may be initially accomplished in view of the fact that when the cores 7 and 12 are at the top position the 100% efficiency indication should be recorded and when the cores 7 and 12 are at the bottom positions a zero efficiency indication is recorded. Once the dial 31 is calibrated, the regulating valve 85 is adjusted to the desired operating pressure as previously described.

Air under pressure flows from the reservoir 81 through pipe 83 and regulating valve 85 to a pulsation dampening reservoir 84, thence through the flanged pipe fitting 66 passing over the two resistance branches (not shown) of the bridge 63 that are housed therein, to the flow meter 62, and through the flow meter to atmosphere past the discharge valve 71 in the discharge conduit 75. As the air under pressure flows through the flow meter 62, the indicator float 72 is positioned within the flow meter at the appropriate indicating mark 89 to indicate the rate of flow of air under pressure from the compressor 80 through the flow meter 62 as described hereinbefore. From previous description and knowledge of the temperature compensation operation involved by the bridge 63, the servomotor 70, and the discharge valve 71, it can be understood that the positioning of the indicator float 72 is an accurate reading of rate of flow with automatic compensation for temperature and pressure variations. Attached to the indicator 72 as by a rod 73 passing through an air-tight bushing 74 is the movable core 12 of the differential transformer 2. The core 12 is positioned by movement of the indicator float 72, and therefore positioning of the core 12 is entirely dependent upon a temperature compensated direct measure of the air compressed by the compressor.

Connected to and operated by the compressor 80 is an alternating current tachometer generator 33 for determining the speed of operation of the compressor in revolutions per minute. The generator 33 has an alternating current output voltage that is proportional to its speed and thus the speed of the compressor 80, said output voltage being of the same frequency as the output voltage of generator 25 which is utilized as a source of exciting voltage for the generator 33.

The output voltage of the generator 33 is fed through the transformer 41 to an amplifier stage of the cathode-follower type utilizing a tube 46, thereby maintaining a constant uniform load on the generator 33 and providing a sufficient power output to the transformer 52 which in turn is the source of power for the auto-transformer 57.

The auto-transformer 57 has a current conducting selector arm 61 operable to complete a circuit to any one of a plurality of taps 58 on the winding 56. The designing of the auto-transformer 57 is technical in nature and not necessary to the understanding of the invention. All that is necessary to understand is that the taps 58 are located at various voltage calibrated intervals, such calibrations designed to supply a certain voltage to indicate a factor D corresponding to the displacement of the compressor per revolution.

In view of this, it can be seen that when the arm 61 of the auto-transformer 57 is on the proper tap 58, the output voltage thereof is proportional to the speed of the compressor (as indicated by the output voltage of generator 33) multiplied by the factor D indicating the volumetric displacement of the compressor in cubic feet per revolution. This just described output voltage of the auto-transformer 57 is supplied to the primary winding 3 of the differential transformer 1.

Associated with the differential transformer 1 is the differential transformer 2. The differential transformers 1 and 2 need not be matched transformers, however, the differential transformer 2 should be capable of a voltage variation over the complete travel of the movable core 12 and thus the connected indicator float 72 in the flow meter 62 between a zero air flow indication and the air flow indicating mark 89 when the compressor 80 is driven at full speed and at a 100% efficiency. The respective secondary windings 4, 5 and 9, 10 of the differential transformers 1 and 2 are connected in series opposition with each other internally and the resultant combined secondaries of each of the differential transformers are also connected in series opposition externally to form a combined secondary circuitry. The generator 25 supplies the primary winding 8 of the differential transformer 2 with an alternating current voltage of similar magnitude and of the same frequency and phase as the voltage supplied to the primary winding 3 of the differential transformer 1 by the auto-transformer 57 as previously described. It can thus be seen that with the primary windings of the two differential transformers 1 and 2 both energized with a similar voltage of the same phase and frequency, and the internally combined secondary windings externally connected in series opposition, the current flow in the externally combined secondary circuitry is of a magnitude proportionate to the relative displacements of the two movable cores 7 and 10 of the respective differential transformers 1 and 2, said current having a phase corresponding to the direction of displacement of one of said movable cores relative to the other, the frequency of the current being unchanged.

The movable core 7 of the differential transformer 1 is connected by a rod 32 to the indicator arm 30 and is thereby positioned by movement of the indicator arm 30 on the dial 31 in correspondence to operation of the servo-motor 21.

The movable core 12 of the differential transformer 2 is connected by a rod 73 to the indicator float 72 of the flow meter 62 and is thus positioned by movement of the indicator float in accordance with the temperature compensated indication of rate of flow as indicated by the indicator float 72 on the indicator marks 89, an operation more thoroughly understood by study of the previously-mentioned copending application.

As explained previously, the voltage in the combined secondary circuitry of the two differential transformers is of the same frequency as the voltage exciting the primary windings, however, its magnitude and phase is dependent on the relative positioning of the two movable cores 7 and 12. This voltage in this combined secondary circuitry is supplied to a serially connected primary winding 15 of a transformer 16 where such voltage is increased and supplied from the secondary winding 17 thereof to a servo-amplifier 20. The servo-amplifier 20 amplifies the voltage delivered thereto and in turn supplies an output voltage to the winding 23 of the servomotor 21 which is the controlling winding thereof. The rotor 24 of the servomotor 21 has not been rotating due to the fact that only the constantly energized winding 22 has been producing flux in the rotor and that flux is of an alternating nature therefore resultant in a zero rotation thereof. However, when the winding 23 is energized also (as just described), the rotor 24 is rotated a limited degree according to the magnitude of the voltage in winding 23 and in a direction determined by the phase of the voltage in the winding 23. Rotation of the rotor 24 produces a like movement of the indicator arm 30 to position the movable core 7 to a balance position to cause a no-voltage condition in the combined secondary circuits of the differential transformers, and simultaneously position the indicator arm 30 on the dial 31 to indicate the volumetric efficiency of the compressor being tested.

To further facilitate an understanding of the operation of the invention, the following conditions are arbitrarily given to a hypothetical compressor test wherein the volumetric efficiency is automatically calculated. Mathematically the volumetric efficiency may be calculated by the equation $$E = \frac{F}{SD}$$

wherein E is the volumetric efficiency, F is the rate of flow in cubic feet per minute compensated for temperature and pressure variations, S is the speed of the compressor in revolutions per minute, and D is the displacement of the compressor in cubic feet. If the compressor is to be driven at 1000 r.p.m. and has a total piston displacement of .05 cubic foot per revolution, the displacement of the compressor D is .05 times 1000 or 50 cubic feet. The auto-transformer 57 is pre-calibrated such that for 50 cubic feet of displacement D a particular one of the taps 58 is connected to the selector arm 61 to provide a particular voltage, for example 5 volts, to the primary winding 3 of the differential transformer 1. It can thus be seen from previous description that as the speed S of the compressor is varied the voltage on the primary winding 3 (representing the product of S times D) will vary accordingly between 0 and 5 volts. The voltage of the secondary circuits of the differential transformer 1 therefore is representative of the product of S times D and can be varied by movement of the core 7. A constant preselected voltage comparative in degree to that supplied to the winding 3 (approximately 5 to 10 volts) is supplied to winding 8 of the differential transformer 2. The voltage in the secondary circuit of the differential transformer 2 represents the rate of flow F of the compressor in that said voltage is regulated by the positioning of the movable core 12 which in turn is positioned corresponding to the compensated rate of flow indicated by the indicator float 72 of the flow meter 62. In that the secondary circuits of each of the differential transformers are opposingly connected to form a combined secondary circuitry in which the primary winding 15 of transformer 16 is imposed, the current in the primary winding 15 is determined by the voltage resultant from combination of the output voltages of the two differential transformers, and the phase of the current is dependent upon the relative positions of the two movable cores 7 and 12. When the resultant voltage output of the two secondary circuits is zero, that is balanced, the current supplied to the servomotor 21 and the torque exerted by the rotor 24 of the servomotor on the indicating arm 30 are correspondingly reduced to zero and the arm 30 is thus stopped in a position directly indicating on the dial 31 the volumetric efficiency of the compressor.

As an example of operation, if a variation of the factors determining efficiency occurs, as for example, a decrease in speed S, the voltage SD delivered to transformer 1 is decreased causing an unbalance of voltage in the combined secondary circuitry to produce a resultant current in the transformer 16 of a magnitude determined by the degree of unbalance, and a resultant phase more representative of the phase of the voltage in the higher voltage secondary circuit (in this instance the secondary of differential transformer 2). The current in the transformer 16 is then amplified by the servo-amplifier 20 and delivered to the winding 23 of the servomotor 21 where the degree of voltage and phase (the determination of which was previously described) determines the amount and direction of rotation of the rotor 24 to cause the movable core 7 to position itself to effect a rebalance of the differential transformer combined secondary circuitry voltages and at the same time relocate the indicator 30 on the dial 31 to indicate the new volumetric efficiency.

Another example of operation is if the rate of flow F is changed, a consequent change in the positioning of the core 12 will occur to thereby unbalance the opposing voltages in the combined secondary circuitry of the differential transformers to effect a voltage on the transformer 16 of a magnitude dependent on the resultant degree of unbalance and a resultant phase more representative of the phase of the higher voltage, said resultant voltage being in turn amplified by the servo-amplifier 20 and supplied to the servomotor 21. Accordingly, the servomotor 21 operates to turn the rotor 24 and connected indicator 30 a degree and direction determined by the magnitude and phase of the voltage on winding 23, to cause the movable core 7 to be repositioned to cause a rebalance of the voltage in the combined secondary circuitry and also to indicate on the dial 31 the new volumetric efficiency effected by the change in rate of flow.

From the above description and examples it can be seen that variation in any of the factors involved in determining the volumetric efficiency of a compressor automatically effects a voltage differential in the combined secondary circuitry of the two differential transformers which in turn, through the use of servomotor 21, effects movement of the core 7 to cause a balance of the opposing voltages in the combined secondary circuitry and a direct and continuous volumetric efficiency reading of a compressor being tested regardless of variations in speed, temperature, pressure, rate of flow and other factors subject to variation during such tests.

While the compressor efficiency determining apparatus disclosed herein is illustrated and described in connection with air compressor efficiency test apparatus, it should be understood that non-combustible gases other than air may be utilized in similar volumetric efficiency tests.

Having now described the invention, what I claim as new and desire to secure by Letters Patent, is:

1. Apparatus for automatically determining and continuously indicating the efficiency of a compressor of the type utilized for compressing non-combustible gases, said apparatus comprising in combination, automatic gas flow metering means including flow indicator means operative to measure the rate of flow of gas supplied by said compressor and operatively responsive to said rate of flow to position said flow indicator in a position indicative of said rate of flow, tachometer means operatively responsive to the speed of said compressor to supply a first alternating current voltage proportional to the speed of said compressor, circuit means including auto-transformer means manually adjustable according to different compressor displacement ratings operative responsively to said first alternating current voltage to develop a second alternating current voltage proportional to the mathematical product of the speed of said compressor as indicated by said first alternating current voltage and the displacement rating of said compressor as indicated by the manual adjustment of the auto-transformer, a first linear variable differential transformer means operatively responsive to said second alternating current voltage, a second linear variable differential transformer means operatively responsive to variations in positioning of said flow indicator of said flow metering means to develop a third alternating current voltage, second circuit means including said first and said second linear variable differential transformer means connected in opposing voltage relationship to develop a fourth alternating current voltage proportional to the mathematical quotient of the second alternating current voltage and the opposing third alternating current voltage, efficiency indicating means, and electrical controlling means operatively responsive to said fourth alternating current voltage to effect equalization of said opposing voltages in said second circuit means to reduce said fourth alternating current voltage to a null voltage and simultaneously causing said efficiency indicating means to indicate the compensated efficiency of said compressor when said null voltage occurs.

2. Apparatus for automatically determining and continuously indicating the efficiency of a compressor of the type utilized for compressing non-combustible gases, said apparatus comprising in combination, automatic gas flow metering means including flow indicator means operative to measure the rate of flow of gas supplied by said compressor and operatively responsive to said rate of flow to position said flow indicator in a position indicative of said rate of flow, tachometer means operatively responsive to the speed of said compressor to supply a first alternating current voltage proportional to the speed of said compressor, circuit means including auto-transformer means manually adjustable according to different compressor displacement ratings operative responsively to said first alternating current voltage to develop a second alternating current voltage proportional to the mathematical product of the speed of said compressor as indicated by said first alternating current voltage and the displacement rating of said compressor as indicated by the manual adjustment of the auto-transformer, a first linear variable differential transformer means operative responsively to said second alternating current voltage, said first linear variable differential transformer having a movable core means operative in different positions to effect supply of a third alternating current voltage, a source of supply voltage, a second linear variable differential transformer means operative responsively to said supply voltage, said second linear variable differential transformer having a movable core means operatively responsive to different positioning of said flow indicator means to effect supply of a fourth alternating current voltage proportionate to the rate of flow of gas through said flow metering means, circuit means operative responsively to the combination of said third alternating current voltage and said fourth alternating current voltage in opposition to each other to supply a fifth alternating current voltage proportionate to the resultant of the combination of said third and fourth alternating current voltages, efficiency indicating means, and electrical controlling means operatively responsive to said fifth alternating current voltage to effect movement of said movable core means of said first linear variable differential transformer means to cause equalization of said third alternating current voltage and said fourth alternating current voltage and simultaneously operate said efficiency indicating means to effect indication of the efficiency of said compressor.

References Cited in the file of this patent
UNITED STATES PATENTS

| | | |
|---|---|---|
| 2,593,660 | Dickey | Apr. 22, 1952 |
| 2,593,661 | Dickey | Apr. 22, 1952 |
| 2,612,777 | Greer | Oct. 7, 1952 |
| 2,800,015 | Shaw | July 23, 1957 |